United States Patent
Wu et al.

(10) Patent No.: US 10,454,298 B2
(45) Date of Patent: Oct. 22, 2019

(54) SOLAR DUAL-SYSTEM CONTROLLER AND CONTROL CIRCUIT THEREOF

(71) Applicant: NINGBO TIANCHENGHUIGUANG SOLAR, LTD., Ninbo (CN)

(72) Inventors: Hongguang Wu, Ninbo (CN); Shaohong Lu, Ninbo (CN)

(73) Assignee: NINGBO TIANCHENGHUIGUANG SOLAR CO., LTD. (CN)

( * ) Notice: Subject to any disclaimer, the term of this patent is extended or adjusted under 35 U.S.C. 154(b) by 104 days.

(21) Appl. No.: 15/819,942

(22) Filed: Nov. 21, 2017

(65) Prior Publication Data

US 2018/0175663 A1    Jun. 21, 2018

(30) Foreign Application Priority Data

Dec. 20, 2016  (CN) .................... 2016 2 1398416 U
Jan. 19, 2017  (CN) .................... 2017 2 0063425 U

(51) Int. Cl.
*H02J 7/35*    (2006.01)

(52) U.S. Cl.
CPC ................. *H02J 7/355* (2013.01); *H02J 7/35* (2013.01)

(58) Field of Classification Search
CPC .................................... H02J 7/355; H02J 7/35
See application file for complete search history.

(56) References Cited

U.S. PATENT DOCUMENTS

2008/0238345 A1* 10/2008 Jaan ................... F21S 9/037
                                                              315/325

* cited by examiner

*Primary Examiner* — Robert L Deberadinis

(57) ABSTRACT

A solar dual-system controller comprising a shell, a solar panel, a circuit board, a first rear cover and a second rear cover; the solar panel is disposed on the outer wall of the shell; the first rear cover is fixed to the shell, thereby forming a first chamber; the circuit board is fixed within the first chamber; a storage battery, which is electrically connected to the circuit board, is fixed within the first chamber; the second rear cover is snapped to the shell, thereby forming a second chamber; a dry battery, which is electrically connected to the circuit board, is detachably disposed within the second chamber.

10 Claims, 5 Drawing Sheets

SOLAR DUAL-SYSTEM CONTROLLER AND CONTROL CIRCUIT THEREOF

TECHNICAL FIELD OF THE INVENTION

The present invention relates to the technical field of controllers, and more particularly, to a solar dual-system controller and a control circuit thereof.

BACKGROUND OF THE INVENTION

A solar controller is an auto-control device used in the solar power generation system, through which a plurality of solar cell modules are controlled to charge a storage battery that can be further controlled to supply power to the loads. The solar controller limits the rate at which electric current is added to or drawn from the storage battery. The solar controller prevents overcharging and performs controlled discharges, which is a core control part of the whole photovoltaic power system.

Solar controllers can be widely applied in various industries. A traditional solar controller used for lamps usually comprises a circuit board, a storage battery and a solar panel. However, such a solar controller often needs to be used in a sunless environment. In such cases, the battery can be completely drained as the consumed electric energy can't be compensated. Thus, the controller needs to be re-exposed to the sun, which is very inconvenient.

SUMMARY OF THE INVENTION

The purpose of the present invention is to solve the shortcomings in the prior art and provide a solar dual-system controller and a control circuit thereof. The present invention is highly practicable and has a simple structure, which can be used in a sunless environment over a prolonged period.

To achieve the above purpose, the present invention adopts the following technical solution:

A solar dual-system controller comprising a shell, a solar panel, a circuit board, a first rear cover and a second rear cover; the solar panel is disposed on the outer wall of the shell; the first rear cover is fixed to the shell, thereby forming a first chamber; the circuit board is fixed within the first chamber; a storage battery, which is electrically connected to the circuit board, is fixed within the first chamber; the second rear cover is snapped to the shell, thereby forming a second chamber; a dry battery, which is electrically connected to the circuit board, is detachably disposed within the second chamber.

In another aspect of the present invention, a first connecting column is disposed on the second rear cover, and a first snap ring, which coordinates with the first connecting column, is disposed on the shell. A snap joint is movably connected to the second rear cover, and a second connecting column is disposed on the snap joint. A clamping block is disposed on the snap joint. The shell is provided with a groove that corresponds to the clamping block. A second snap ring, which coordinates with the second connecting column, is disposed on the second rear cover.

In another aspect of the present invention, sealing gaskets are provided at the point where the shell and the first rear cover are connected, and at the point where the shell and the second rear cover are connection.

In another aspect of the present invention, the first rear cover is provided with a through-hole for installing a switch. The switch is electrically connected to the circuit board through the through-hole.

In another aspect of the present invention, a waterproof cap, which is disposed at the exterior of the through-hole, is made from a flexible material.

In another aspect of the present invention, the first rear cover is provided with a sliding chute.

A control circuit of the solar dual-system controller comprising a solar panel, a storage battery, a dry battery, a resistor R1, a resistor R2, a resistor R3, a resistor R4, a resistor R5, a T33 step-down power supply chip U1, a triode T1, a triode T3, a MOS field effect transistor Q1, a LED lamp, an inductor L1, a switch, a diode D1, a diode D2, a diode D3, a resistor RL and a single-chip microcomputer G; the emitting electrode of the triode T1 is connected to the ground GND, and the base electrode of the triode T1 is connected to the ground GND through the resistor R2; the collecting electrode of the triode T1 is connected to the single-chip microcomputer G; the base electrode of the triode T1 is connected to the positive electrode of the diode D1 through the resistor R1; the positive electrode of the diode D1 is connected to the ground GND through the solar panel, and the negative electrode of the diode D1 is connected to the ground GND through the storage battery; the negative electrode of the diode D1 is connected to one end of the switch through the diode D2, and the other end of the switch is connected to a first base pin of the T33 step-down power supply chip U1 through the inductor L1; the positive electrode of the diode D1 is connected to the base electrode of the triode T3 through the resistor R3; one end of the resistor R4 is connected to the ground GND, and the other end of the resistor R4 is connected to the base electrode of the triode T3; the emitting electrode of the triode T3 is connected to the ground GND; the collecting electrode of the triode T3 is connected to a third base pin of the T33 step-down power supply chip U1 through the resistor R5; a second base pin of the T33 step-down power supply chip U1 is connected to the ground GND; the third base pin of the T33 step-down power supply chip U1 is connected to the positive electrode of the LED lamp through the resistor RL; the negative electrode of the LED lamp is connected to the single-chip microcomputer G; the collecting electrode of the triode T3 is connected to the gate electrode G of the MOS field effect transistor Q1, and the source electrode S of the MOS field effect transistor Q1 is connected to the negative electrode of the diode D3; the positive electrode of the diode D3 is connected to the ground GND through the dry battery; the drain electrode D of the MOS field effect transistor Q1 is connected to one end of the switch; the third base pin of the T33 step-down power supply chip U1 is connected to the single-chip microcomputer G.

In another aspect of the present invention, the solar dual-system controller further comprises a capacitor C2. The third base pin of the T33 step-down power supply chip U1 is connected to the ground GND through the capacitor C2.

In another aspect of the present invention, the capacitor C2 is a polar capacitor.

In another aspect of the present invention, the triode T1 and the triode T3 are both NPN triodes. The MOS field effect transistor Q1 is an N-channel field effect transistor.

Compared with the prior art, the present invention has the following advantages:

Through the integration of the solar panel disposed on the shell 1 and the storage battery A, the excess electricity is stored in the storage battery A, thereby greatly reducing energy loss. Additionally, the dry battery B disposed in the second chamber 13 enables the controller to be used in a dark environment over a prolonged period. Compared with controllers that merely consume solar energy, the present invention is highly practicable and convenient due to its simple structure.

BRIEF DESCRIPTION OF THE DRAWINGS

To clearly expound the technical solution of the present invention, the drawings and embodiments are hereinafter combined to illustrate the present invention. Obviously, the drawings are merely some embodiments of the present invention and those skilled in the art can associate themselves with other drawings without paying creative labor.

MARKING INSTRUCTIONS OF THE DRAWINGS

1, Shell; 3, Circuit Board; 4, The First Rear Cover; 5, The Second Rear Cover; 6, Snap Joint; 7, Sealing Gasket; 9, Waterproof Cap; 11, The First Chamber; 13, The Second Chamber; 15, The First Snap Ring; 16, Groove; 41, Through-hole; 42, Sliding Chute; 51, The First Connecting Column; 52, The Second Snap Ring; 61, The Second Connecting Column; 62, Clamping Block; A, Storage Battery; B, Dry Battery; C, Solar Panel; SW, Switch; LED, Lamp

DETAILED DESCRIPTION OF THE INVENTION

Drawings and detailed embodiments are combined hereinafter to elaborate the technical principles of the present invention.

Embodiment 1

Figure 1:
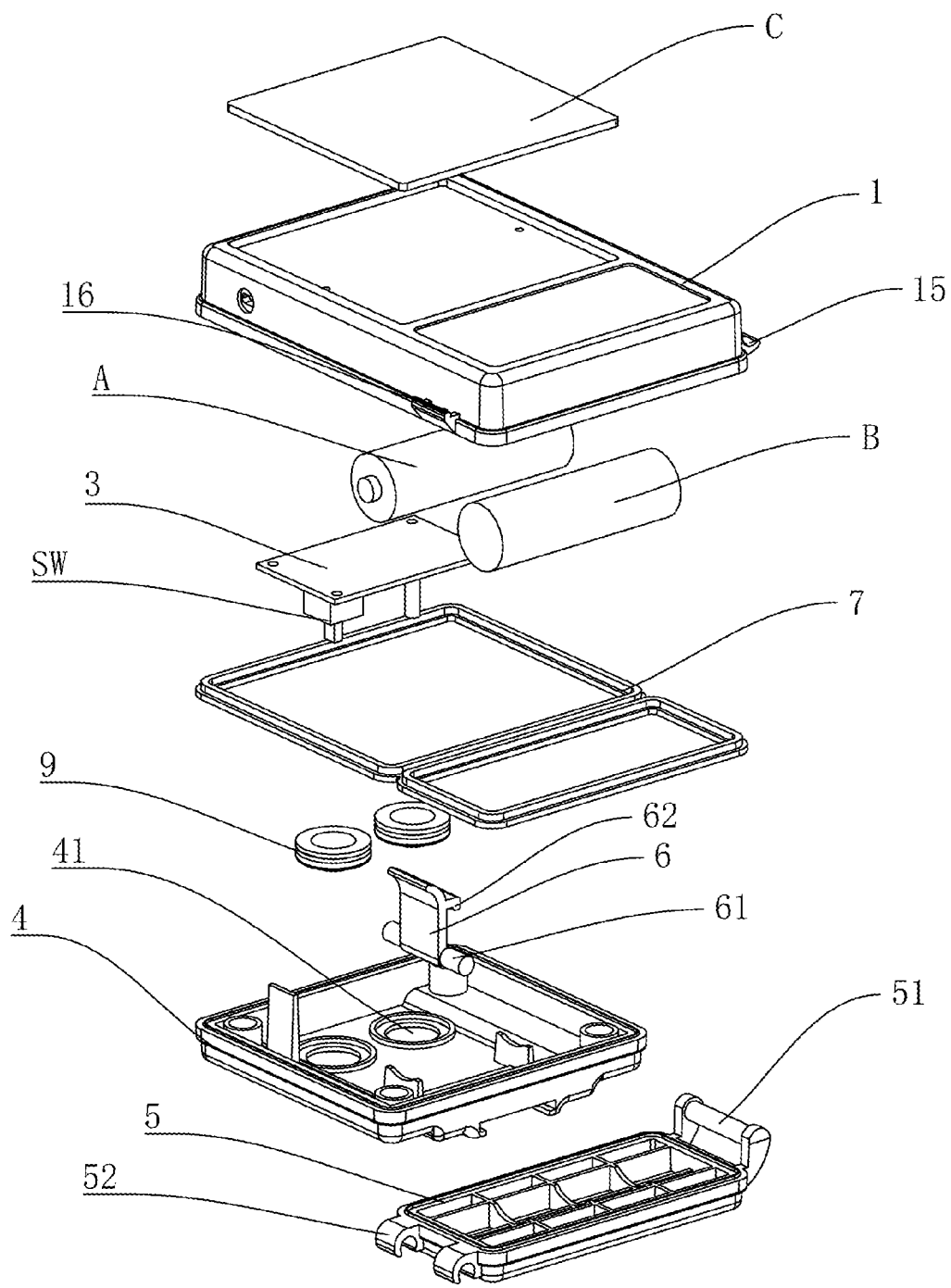
FIG. 1 is an exploded view illustrating the overall structure of the solar dual-system controller of embodiment 1 of the present invention.
Figure 2:
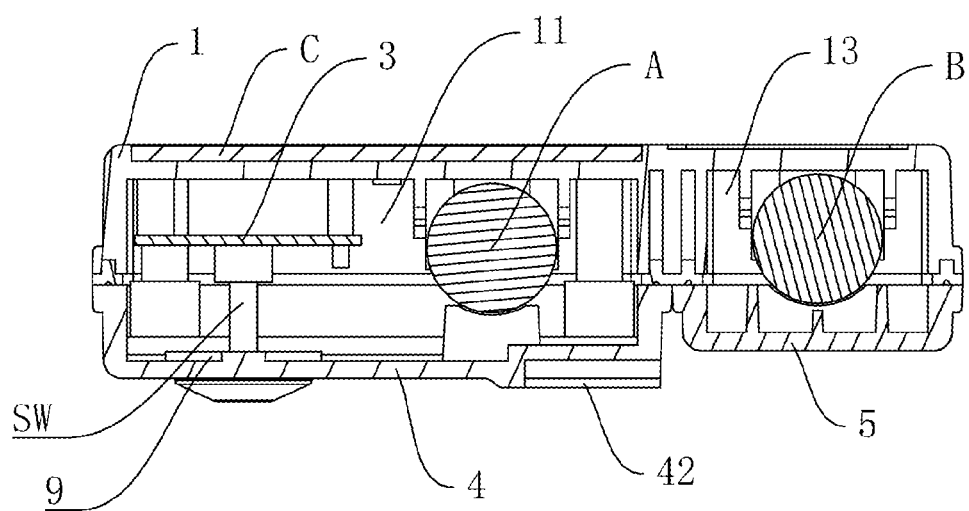
FIG. 2 is a sectional view illustrating the overall structure of the solar dual-system controller of embodiment 1 of the present invention.
Figure 3:
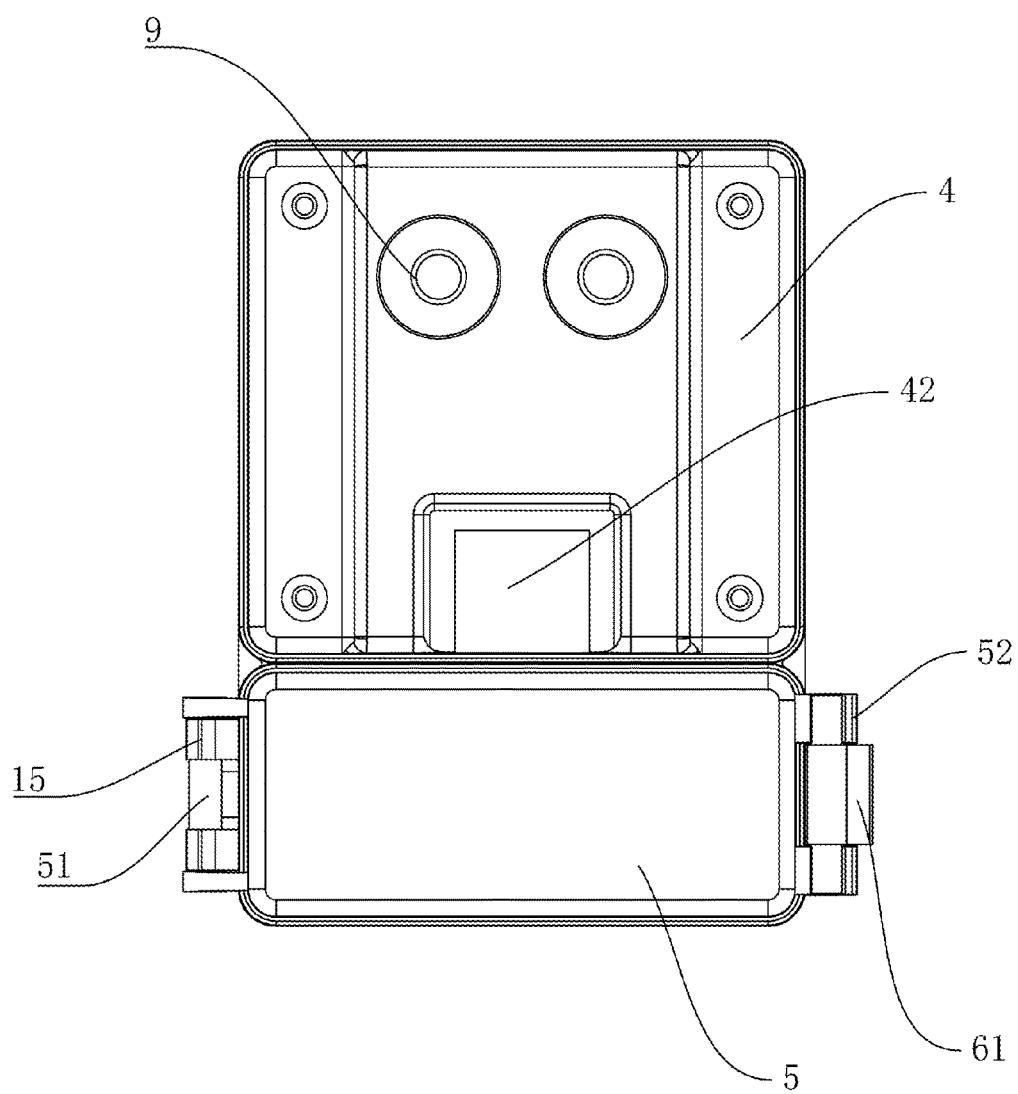
FIG. 3 is a structural diagram illustrating the overall structure of the rear portion of the solar dual-system controller of embodiment 1 the present invention.

As shown in FIGS. 1-3, the solar dual-system controller comprises a shell 1, a solar panel C, a circuit board 3, a first rear cover 4 and a second rear cover 5. The solar panel C is disposed on the outer wall of the shell 1. The first rear cover 4 is fixed to the shell 1, thereby forming a first chamber 11. The circuit board 3 is fixed within the first chamber 11. A storage battery A, which is electrically connected to the circuit board 3, is fixed within the first chamber 11. The second rear cover 5 is snapped to the shell 1, thereby forming a second chamber 13. A dry battery B, which is electrically connected to the circuit board 3, is detachably disposed within the second chamber 13. Through the interaction between the solar panel disposed on the shell 1 and the storage battery A, the excess electricity is stored in the storage battery A, greatly reducing the energy loss. Further, the dry battery B disposed in the second chamber 13 enables the controller function in a dark environment over a prolonged period of time. Compared with controllers that merely consume solar energy, the present invention has a higher practicability; and present invention is very easy to use due to its simple structure.

In this embodiment, a first connecting column 51 is disposed on the second rear cover 5, and a first snap ring 15, which coordinates with the first connecting column 51, is disposed on the shell 1. A snap joint 6 is movably connected to the second rear cover 5, and a second connecting column 61 is disposed on the snap joint 6. A second snap ring 52, which integrates with the second connecting column 61, is disposed on the second rear cover 5. A clamping block 62 is disposed on the snap joint 6. The shell 1 is provided with a groove 16 that corresponds to the clamping block 62. The contact surface between the clamping block 62 and the groove 16 is configured to be arc-shaped.

Through the cooperation between the first connecting column 51 and the first snap ring 15, the second rear cover 5 takes the first connecting column 51 as the center to rotate in an axial direction. Meanwhile, through the cooperation between the second connecting column 61 and the second snap ring 52, the snap joint 6 takes the second connecting column 61 as the center to rotate in an axial direction. Furthermore, through the cooperation between the clamping block 62 and the groove 16, the second rear cover 5 is tightly engaged with the shell 1. The arc surface of the clamping block 62 enables the clamping block 62 to be conveniently snapped to the groove 16.

In this embodiment, the solar panel C is fixed on the shell 1 so that the stability of the solar panel C can be greatly improved.

Furthermore, sealing gaskets 7 are provided at the point where the shell 1 and the first rear cover 4 are connected, and at the point where the shell 1 and the second rear cover 5 are connected. The sealing gasket 7 is configured in an integrated structure so that the sealing performance of the solar controller can be greatly enhanced. Meanwhile, water and dust are prevented from entering into the controller so that the controller can be protected.

In this embodiment, the first rear cover 4 is provided with a through-hole 41 for installing a switch. The switch is electrically connected to the circuit board 3 through the through-hole 41. A waterproof cap 9, which is disposed at the exterior of the through-hole 41, is made from a flexible material. The waterproof cap 9 can prevent the water from seeping into the portion where the switch and the shell 1 are connected.

In this embodiment, there are two switches. During operation, one switch is used as a main switch for controlling the switching on/off of the power supply, and the other is used as a function switch for controlling the working performance (e.g., the light change) of a lamp that is connected to the function switch. Such a dual-switch control mode can be achieved through the integrated circuit in the circuit board 3. Without affecting the integrity of the technical solution of the present invention, the control principle is not described in detail herein. Accordingly, in this embodiment, there are two through-holes 41 and waterproof caps 9, which correspond to the aforesaid switches in a one-to-one ratio.

Additionally, the first rear cover 4 is provided with a sliding chute 42, through which the placement of the controller can be fixed. Meanwhile, it enables the controller to be quickly installed in various environments.

Embodiment 2

Figure 4:
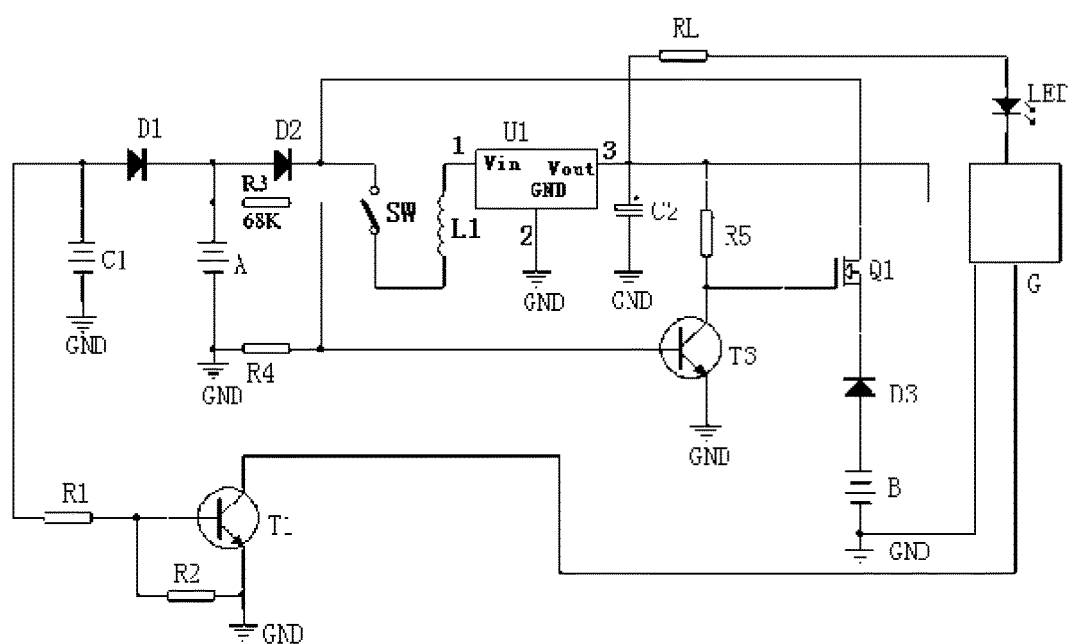
FIG. 4 is a schematic diagram of the control circuit of the solar dual-system controller of the present invention.

As shown in FIG. 4, the control circuit of the solar dual-system controller of the present invention comprises a solar panel C, a storage battery A, a dry battery B, a resistor R1, a resistor R2, a resistor R3, a resistor R4, a resistor R5, a T33 step-down power supply chip U1, a triode T1, a triode T3, a MOS field effect transistor Q1, a LED lamp, an inductor L1, a switch SW, a diode D1, a diode D2, a diode D3, a resistor RL and a single-chip microcomputer G. The emitting electrode of the triode T1 is connected to the ground GND, and the base electrode of the triode T1 is connected to the ground GND through the resistor R2. The collecting electrode of the triode T1 is connected to the single-chip microcomputer G. The base electrode of the triode T1 is connected to the positive electrode of the diode D1 through the resistor R1. The positive electrode of the diode D1 is connected to the ground GND through the solar panel C, and the negative electrode of the diode D1 is connected to the ground GND through the storage battery A. The negative electrode of the diode D1 is connected to one end of the switch SW through the diode D2, and the other end of the switch SW is connected to a first base pin of the T33 step-down power supply chip U1 through the inductor L1. The positive electrode of the diode D1 is connected to the base electrode of the triode T3 through the resistor R3. One end of the resistor R4 is connected to the ground GND, and the other end of the resistor R4 is connected to the base electrode of the triode T3. The emitting electrode of the triode T3 is connected to the ground GND. The collecting electrode of the triode T3 is connected to a third base pin of the T33 step-down power supply chip U1 through the resistor R5. A second base pin of the T33 step-down power supply chip U1 is connected to the ground GND. The third base pin of the T33 step-down power supply chip U1 is connected to the positive electrode of the LED lamp through the resistor RL. The negative electrode of the LED lamp is connected to the single-chip microcomputer G. The collecting electrode of the triode T3 is connected to the gate electrode G of the MOS field effect transistor Q1, and the source electrode S of the MOS field effect transistor Q1 is connected to the negative electrode of the diode D3. The positive electrode of the diode D3 is connected to the ground GND through the dry battery B. The drain electrode D of the MOS field effect transistor Q1 is connected to one end of the switch SW. The third base pin of the T33 step-down power supply chip U1 is connected to the single-chip microcomputer G.

In this embodiment, the solar controller of the present invention further comprises a capacitor C2. The third base pin of the T33 step-down power supply chip U1 is connected to the ground GND through the capacitor C2. The capacitor C2 is preferably a polar capacitor.

Furthermore, in this embodiment, the triode T1 and the triode T3 are both NPN triodes. The MOS field effect transistor Q1 is an N-channel field effect transistor.

The working principle of the present invention is the following:

The Solar panel C absorbs and converts sunlight into electricity, thereby charging the storage battery A through the diode D1. Meanwhile, the current generated by solar energy is supplied to the triode T1 through the resistors R1 and R2. Thus, the triode T1 is turned on. Subsequently, the single-chip microcomputer G is turned off and not in a working state. When the sunlight becomes dim or disappears, the triode T1 is turned off again. At this moment, the single-chip microcomputer G is re-initiated to work. The rechargeable battery A supplies power to the T33 step-down power supply chip U1 through the diode D2, the switch SW and the inductor L1, and the third base pin of the T33 step-down power supply chip U1 supplies power to the single-chip microcomputer G after being filtered by the capacitor C1. The resistors R3, R4 and R5 form a low voltage protection circuit to protect the rechargeable battery A from being over-discharged. When the electric power of the storage battery A is insufficient or empty, the dry battery B starts to supply power to the single-chip microcomputer G through a backward diode D3 and the MOS field effect transistor Q1.

The solar panel C, the storage battery A and the dry battery B of the present invention can be switched to one another so that electric power can be steadily supplied to the loads. Thus, the usage rate of the loads can be protected from being affected even the electric power is insufficient or the power supply is damaged, and the lifespan of the loads can be effectively prolonged.

Embodiment 3

Figure 5:
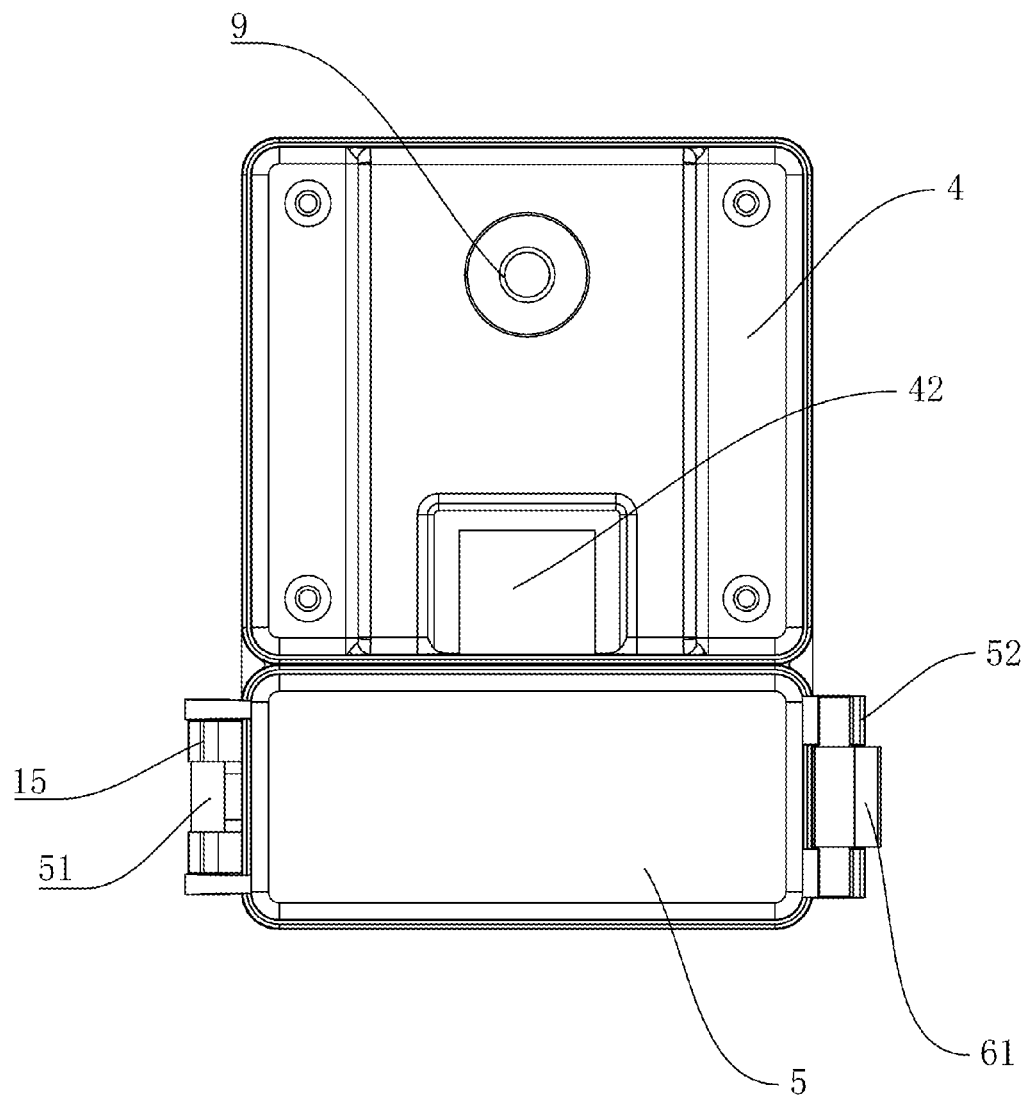
FIG. 5 is a structural diagram illustrating the overall structure of the rear portion of the solar dual-system controller of embodiment 2 the present invention.

As shown in FIG. 5, the main structure of the controller in embodiment 3 is same as that in embodiment 1. The different between them is that embodiment 3 adopts only one switch that is used for controlling the switching on/off of the power supply. Accordingly, in this embodiment, there is one through-hole 41 and waterproof cap 9. The through-hole 41 and the waterproof cap 9 are disposed to correspond to the aforesaid switch.

The description of the above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:

1. A solar dual-system controller, comprising:
   a shell,
   a solar panel,
   a circuit board,
   a first rear cover, and
   a second rear cover, wherein the solar panel is disposed on the outer wall of the shell, wherein the first rear cover is fixed to the shell, thereby forming a first chamber, wherein the circuit board is fixed within the first chamber, wherein a storage battery, which is electrically connected to the circuit board, is fixed within the first chamber, wherein the second rear cover is snapped to the shell, thereby forming a second chamber, wherein a dry battery, which is electrically connected to the circuit board, is detachably disposed within the second chamber.

2. The solar dual-system controller of claim 1, wherein a first connecting column is disposed on the second rear cover, and a first snap ring, which coordinates with the first connecting column, is disposed on the shell, wherein a snap joint is movably connected to the second rear cover, and a second connecting column is disposed on the snap joint, wherein a clamping block is disposed on the snap joint, wherein the shell is provided with a groove that corresponds to the clamping block, wherein a second snap ring, which coordinates with the second connecting column, is disposed on the second rear cover.

3. The solar dual-system controller of claim 1, wherein sealing gaskets are provided at the point where the shell and the first rear cover are connected, and at the point where the shell and the second rear cover are connected.

4. The solar dual-system controller of claim 1, wherein the first rear cover is provided with a through-hole for installing a switch, wherein the switch is electrically connected to the circuit board through the through-hole.

5. The solar dual-system controller of claim 4, wherein a waterproof cap, which is disposed at the exterior of the through-hole, is made from a flexible material.

6. The solar dual-system controller of claim 1, wherein the first rear cover is provided with a sliding chute.

7. A control circuit of the solar dual-system controller, comprising:
   a solar panel,
   a storage battery,
   a dry battery,
   a resistor R1,
   a resistor R2,
   a resistor R3,
   a resistor R4,
   a resistor R5,
   a T33 step-down power supply chip U1,
   a triode T1,
   a triode T3,
   a MOS field effect transistor Q1,
   a LED lamp,
   an inductor L1,
   a switch,
   a diode D1,
   a diode D2,
   a diode D3,
   a resistor RL, and
   a single-chip microcomputer G wherein the emitting electrode of the triode T1 is connected to the ground GND, and the base electrode of the triode T1 is connected to the ground GND through the resistor R2, wherein the collecting electrode of the triode T1 is connected to the single-chip microcomputer G, wherein the base electrode of the triode T1 is connected to the positive electrode of the diode D1 through the resistor R1, wherein the positive electrode of the diode D1 is connected to the ground GND through the solar panel, and the negative electrode of the diode D1 is connected to the ground GND through the storage battery, wherein the negative electrode of the diode D1 is connected to one end of the switch through the diode D2, and the other end of the switch is connected to a first base pin of the T33 step-down power supply chip U1 through the inductor L1, wherein the positive electrode of the diode D1 is connected to the base electrode of the triode T3 through the resistor R3, wherein one end of the resistor R4 is connected to the ground GND, and the other end of the resistor R4 is connected to the base electrode of the triode T3, wherein the emitting electrode of the triode T3 is connected to the ground GND, wherein the collecting electrode of the triode T3 is connected to a third base pin of the T33 step-down power supply chip U1 through the resistor R5, wherein a second base pin of the T33 step-down power supply chip U1 is connected to the ground GND, wherein the third base pin of the T33 step-down power supply chip U1 is connected to the positive electrode of the LED lamp through the resistor RL, wherein the negative electrode of the LED lamp is connected to the single-chip microcomputer G, wherein the collecting electrode of the triode T3 is connected to the gate electrode G of the MOS field effect transistor Q1, and the source electrode S of the MOS field effect transistor Q1 is connected to the negative electrode of the diode D3, wherein the positive electrode of the diode D3 is connected to the ground GND through the dry battery, wherein the drain electrode D of the MOS field effect transistor Q1 is connected to one end of the switch, wherein the third base pin of the T33 step-down power supply chip U1 is connected to the single-chip microcomputer G.

8. The solar dual-system controller of claim 7, wherein the solar dual-system controller further comprises a capacitor C2, wherein the third base pin of the T33 step-down power supply chip U1 is connected to the ground GND through the capacitor C2.

9. The solar dual-system controller of claim 8, wherein the capacitor C2 is a polar capacitor.

10. The solar dual-system controller of claim 7, wherein the triode T1 and the triode T3 are both NPN triodes, wherein the MOS field effect transistor Q1 is an N-channel field effect transistor.

* * * * *